US007139105B2

(12) United States Patent
Mori (10) Patent No.: US 7,139,105 B2
(45) Date of Patent: Nov. 21, 2006

(54) IMAGE READING APPARATUS FOR OPTICALLY READING AN IMAGE

(75) Inventor: Takeshi Mori, Machida (JP)

(73) Assignee: Olympus Optical Co., Ltd., Tokyo (JP)

( * ) Notice: Subject to any disclaimer, the term of this patent is extended or adjusted under 35 U.S.C. 154(b) by 882 days.

(21) Appl. No.: 10/007,281

(22) Filed: Dec. 3, 2001

(65) Prior Publication Data
US 2002/0075526 A1 Jun. 20, 2002

(30) Foreign Application Priority Data
Dec. 15, 2000 (JP) ............................. 2000-382446

(51) Int. Cl.
*H04N 1/40* (2006.01)
*H04N 1/04* (2006.01)
*G06K 9/34* (2006.01)
*G06K 9/38* (2006.01)

(52) U.S. Cl. ...................... 358/465; 358/466; 358/475; 358/446; 382/272; 382/176

(58) Field of Classification Search ................ 358/446, 358/466, 475, 465; 382/272, 176
See application file for complete search history.

(56) References Cited

U.S. PATENT DOCUMENTS

| 5,014,332 A | * | 5/1991 | Nakajima et al. ........... 382/274 |
| 5,724,364 A | | 3/1998 | Mori et al. |
| 5,771,422 A | * | 6/1998 | Morihara ..................... 399/50 |

* cited by examiner

*Primary Examiner*—David Moore
*Assistant Examiner*—Houshang Safaipour
(74) *Attorney, Agent, or Firm*—Frishauf, Holtz, Goodman & Chick, P.C.

(57) ABSTRACT

An image reading apparatus for optically reading an image comprises an LED for lighting a predetermined region including an object to be read, an image pickup element for receiving reflected light from the predetermined region lit by the LED and outputting an corresponding image pickup signal, a CPU for controlling an amount of light emitted by the LED in a predetermined range such that the image pickup signal output from the image pickup element is at the proper level, and a dark image pickup detecting circuit for determining a dark image pickup state on the basis of the image pickup signal output from the image pickup element. When the dark image pickup detecting circuit determines the dark image pickup state, the CPU controls an amount of light emitted by the LED to be low.

24 Claims, 4 Drawing Sheets

IMAGE READING APPARATUS FOR OPTICALLY READING AN IMAGE

CROSS-REFERENCE TO RELATED APPLICATIONS

This application is based upon and claims the benefit of priority from the prior Japanese Patent Application No. 2000-382446, filed Dec. 15, 2000, the entire contents of which are incorporated herein by reference.

BACKGROUND OF THE INVENTION

1. Field of the Invention

The present invention relates to an image reading apparatus for optically reading an image such as characters, patterns or the like, or an image such as a coded image represented by a one- or two-dimensional bar code, or the like.

2. Description of the Related Art

Various image reading apparatuses have been known as apparatuses for optically reading an image such as characters, pattern or the like, or an image such as a coded image represented by one- or two-dimensional bar code, or the like.

Some of these apparatuses light a predetermined region including an image to be read by lighting means which have a light source such as an LED, and receive light refracted by the predetermined lighted region, thereby reading the image.

For example, an apparatus disclosed in U.S. Pat. No. 5,724,364 is one of such type.

The image reading apparatus disclosed in U.S. Pat. No. 5,724,364 is configured to detect the maximum value of the image pickup signal supplied from the image pickup means, including image pickup elements such as a CCD, MOS or the like, and perform feedback control on the amount of light generation by the lighting means. More specifically, the apparatus is configured, when the amount of receiving light in image reading is small, to increase the amount of light generation if the light means does not generate light at the maximum. On the other hand, when the amount of receiving light is so high as to exceed the dynamic range of the image pickup element, the apparatus is configured to reduce the amount of light generated if the light means does not generate light at the minimum.

Figure 1:
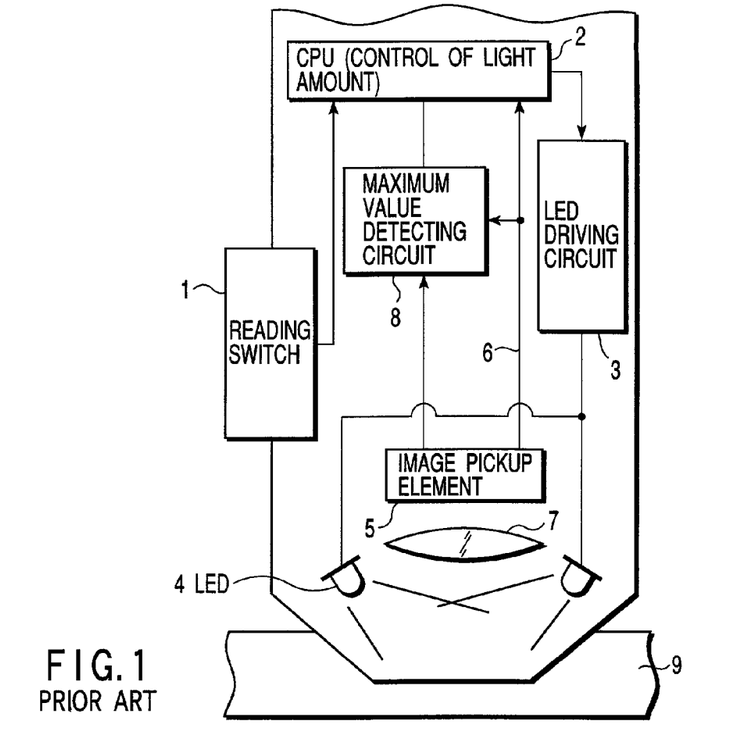
FIG. 1 is a diagram showing a partial circuit arrangement relating to control of lighting in a conventional image reading apparatus.

FIG. 1 shows a partial circuit arrangement relating to control of the lighting in the reading apparatus disclosed in U.S. Pat. No. 5,724,364.

When an operator operates a reading switch 1, an operation start signal is input into a CPU 2. In accordance with the input signal, the CPU 2 starts an LED driving circuit 3 so as to cause a LED 4 to emit pulsed light. The start of the emission of the each pulse is synchronized with a perpendicular synchronous signal 6 to be output from an image pickup element 5.

The image pickup element 5 receives the reflected light from a predetermined region lit by the LED 4 and including, for example, an image to be read on paper, through an optical system such as a lens 7 or the like. And then, the element 5 photoelectrically transduces the received light and outputs an image pickup signal, corresponding to the input light, to a maximum value detecting circuit 8.

The maximum value detecting circuit 8 detects the maximum value of one frame and outputs it to the CPU 2. The maximum value detection is renewed for each frame.

Figure 2:
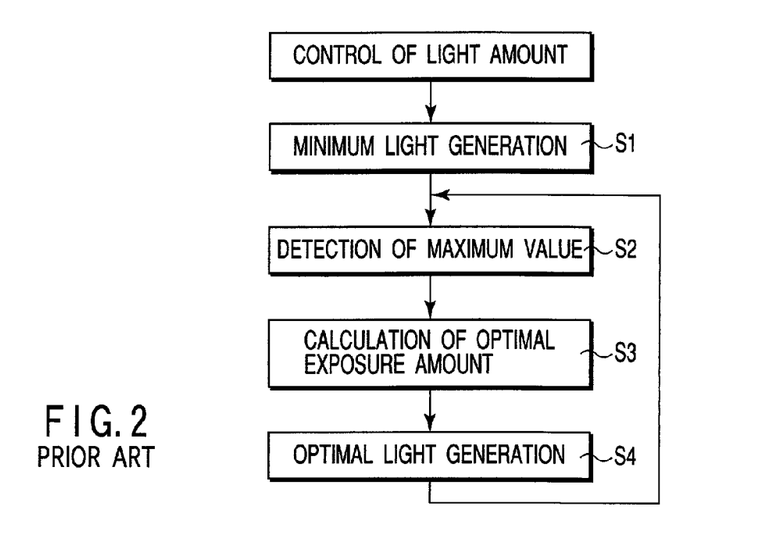
FIG. 2 is a diagram for explaining a conventional method of controlling an amount of light generated.

The method of the CPU 2 uses to control the amount of light generated will be explained with reference to FIG. 2.

Immediately after the start of image pickup, the CPU 2 causes the LED 4 to emit light at the minimum for performing a proper exposure (Step S1).

Then, the maximum value of the input image at the emitting of the LED 4 is detected (Step S2).

After that, on the basis of the detected maximum value, the optimal exposure time is calculated from a table prepared in advance (Step S3), and the LED 4 is caused to emit light in accordance with the optimal exposure time (Step S4). The control of the amount of light generated by the LED 4 is performed by controlling, for example, the pulse width or pulse height of the generated light.

These operations S2 to S4 are repeated in units of image pickup frames.

With such a structure, it is possible to eliminate variations in the amount of receiving light incident on the image pickup element 5 owing to variations in the LED 4, or variations in operation, such as floating-up of the reading apparatus or the like, and thus it becomes possible to attain an image pickup output having a good S/N ratio and being close to the upper-limit of the dynamic range.

However, in the above-mentioned reading apparatus, when the maximum value of the image pickup signal from the image pickup means is small, the apparatus is configured to emit light at the maximum amount. Therefore, for example, when the reading apparatus is not directed at the image to be read, and instead points midair, no light is reflected back. Thus, the output from the image pickup element 5 becomes very small.

In particular, with respect to what is known as a manually-operated scanning device, such as a reading apparatus which is configured to set an iris small so as to set the depth of field in order to always come into focus on an image pickup plane 9 even though a certain distance exists between the image pickup plane 9 and the apparatus, and is configured to scan and read an object to be read by a manual scanning operation, when it picks up no definite image in such a manner, the incident light is smaller than that of the other type. Thus, an output from the image pickup element 5 can be seldom attained.

As a result, in this case, the LED driving circuit 3 controls the LED 4 to emit light at the maximum in order to attain output from the image pickup element 5.

It can be considered that the output from the image pickup element 5 cannot be attain as, basically, a period where information of an object image to be read is not input. Therefore, it is not preferable to emit light at the maximum at that period since electricity is wasted. Particularly, most portable image reading apparatuses are driven by batteries, and therefore, a problem arises in that the battery life is unnecessarily shortened.

BRIEF SUMMARY OF THE INVENTION

An object of the present invention, which has been achieved in view of the situation described above, is to provide an image reading apparatus determines a state where an object image to be read is not input as a dark image pickup state so as to prevent the waste of electric power consumption.

According to an aspect of the present invention, there is provided an image reading apparatus for optically reading an image, comprising:

lighting means for lighting a predetermined region including an object to be read;

image pickup means for receiving reflected light from the predetermined region lit by the lighting means and outputting a corresponding image pickup signal;

lighting control means for controlling an amount of light emitted by the lighting means in a predetermined range so as to arrange the image pickup signal output from the image pickup means at a proper level; and determining means for determining a dark image pickup state on the basis of the image pickup signal output from the image pickup means, wherein the lighting control means controls the amount of light emitted by the lighting means to be low when the determining means determines the dark image pickup state.

According to an another aspect of the present invention, there is provided an image reading apparatus for optically reading an image, comprising:

a LED for lighting a predetermined region including an object to be read;

an image pickup element for receiving reflected light from the predetermined region lit by the LED and outputting a corresponding image pickup signal;

a dark image pickup detecting circuit for determining a dark image pickup state on the basis of the image pickup signal output from the image pickup element; and a control section for controlling an amount of light supplied by the LED within a predetermined range to set the image pickup signal output from the image pickup element at a proper level, and controlling an amount of light supplied from the LED to be low, when the dark image pickup detecting circuit determines a dark image pickup state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

DETAILED DESCRIPTION OF THE INVENTION

Embodiments of the invention now will be explained with reference to the accompanying drawings.

First Embodiment

Figure 3:
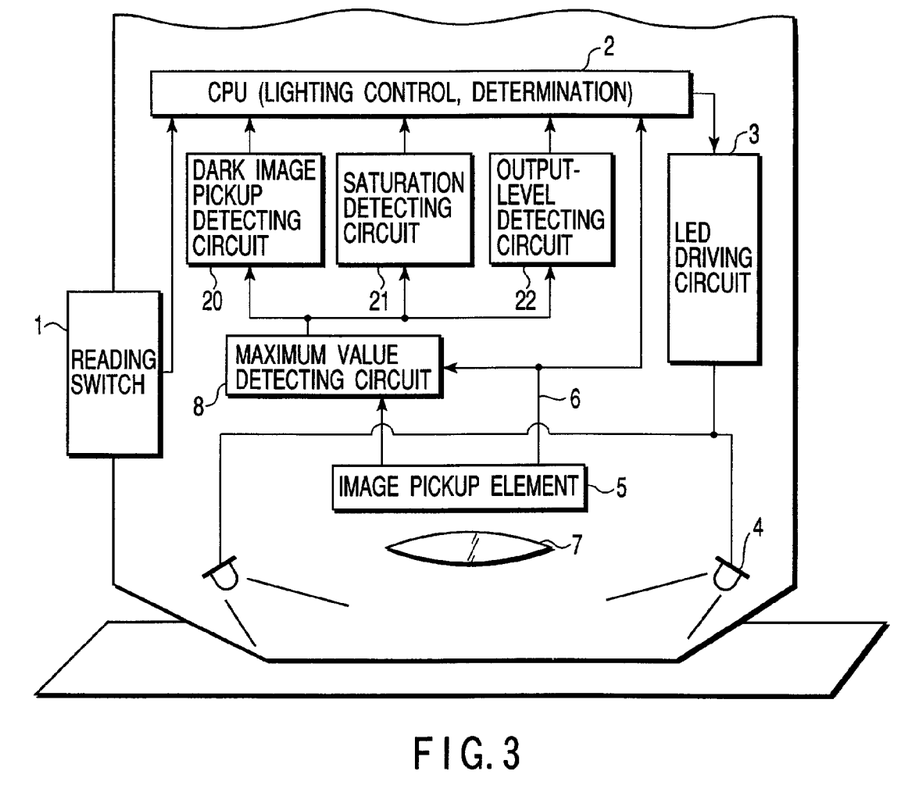
FIG. 3 is a diagram showing an arrangement of an image reading apparatus according to a first embodiment of the invention.

FIG. 3 is a diagram showing an arrangement of an image reading apparatus of a manually-operated scanning type, according to a first embodiment of the invention.

When an operator operates the reading switch 1, a reading operation start signal is input into the CPU 2. In accordance with the start signal, the CPU 2 supplies a predetermined pulse to the LED driving circuit 3. In the first embodiment, the apparatus is configured to control an amount of light emitted from the LED 4 with a pulse width. On receiving the pulse from the CPU 2, the LED driving circuit 3 causes the LED 4 to emit pulsed light.

The image pickup element 5 receives reflected light from a predetermined region including an object image to be read, which is lit by the LED 4, through the lens 7. The element 5, then, photoelectrically transduces the reflected light and inputs an image pickup signal corresponding to the reflected light into the maximum value detecting circuit 8.

Figure 4:
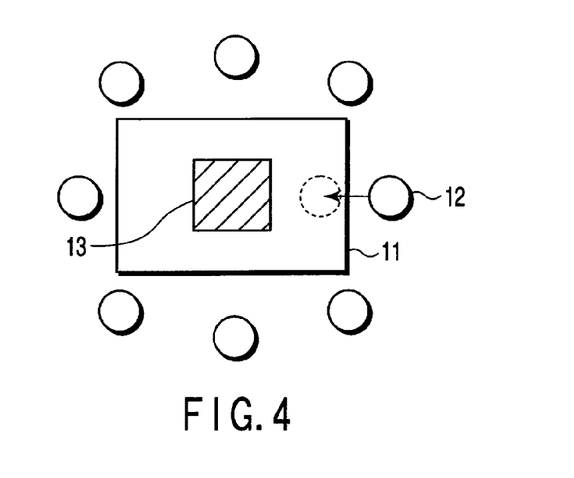
FIG. 4 is a diagram showing an area where the maximum value is to be detected.

In this embodiment, it is preferable to set an area where the maximum value is to be detected at a substantial center area 13 of an image pickup display, as shown in FIG. 4. The reason for this is as follows. When an image pickup object region 11 is set as in FIG. 4, the LED 4 is generally positioned at the peripheral upper area of an image pickup object region 11 so as to prevent regular reflection. At this time, an LED immediately under area 12 becomes brightest. Even if the image reading apparatus is not tilted in reading performed by a manual scanning operation, a regular reflection is not input into the image pickup element 5. However, depending on the direction of tilting, the LED immediately under area 12 comes into the image pickup object region 11 and becomes the regular reflection. Due to this, regular reflection is likely to occur at a peripheral region of the image pickup display. Therefore, in order to prevent detection of the maximum value with regular reflection, the detection of the maximum value must be performed at the center area 13 of the image pickup object region 11.

The maximum value detecting circuit 8 detects the maximum value for each frame and supplies an output representing the detected value to a dark image pickup detecting circuit 20, saturation detecting circuit 21 and output-level detecting circuit 22. The output from the maximum value detecting circuit 8 is renewed in synchronization with the perpendicular synchronous signal 6 for the respective frames.

The process of this processing will be explained with reference to FIG. 5.

Figure 5:
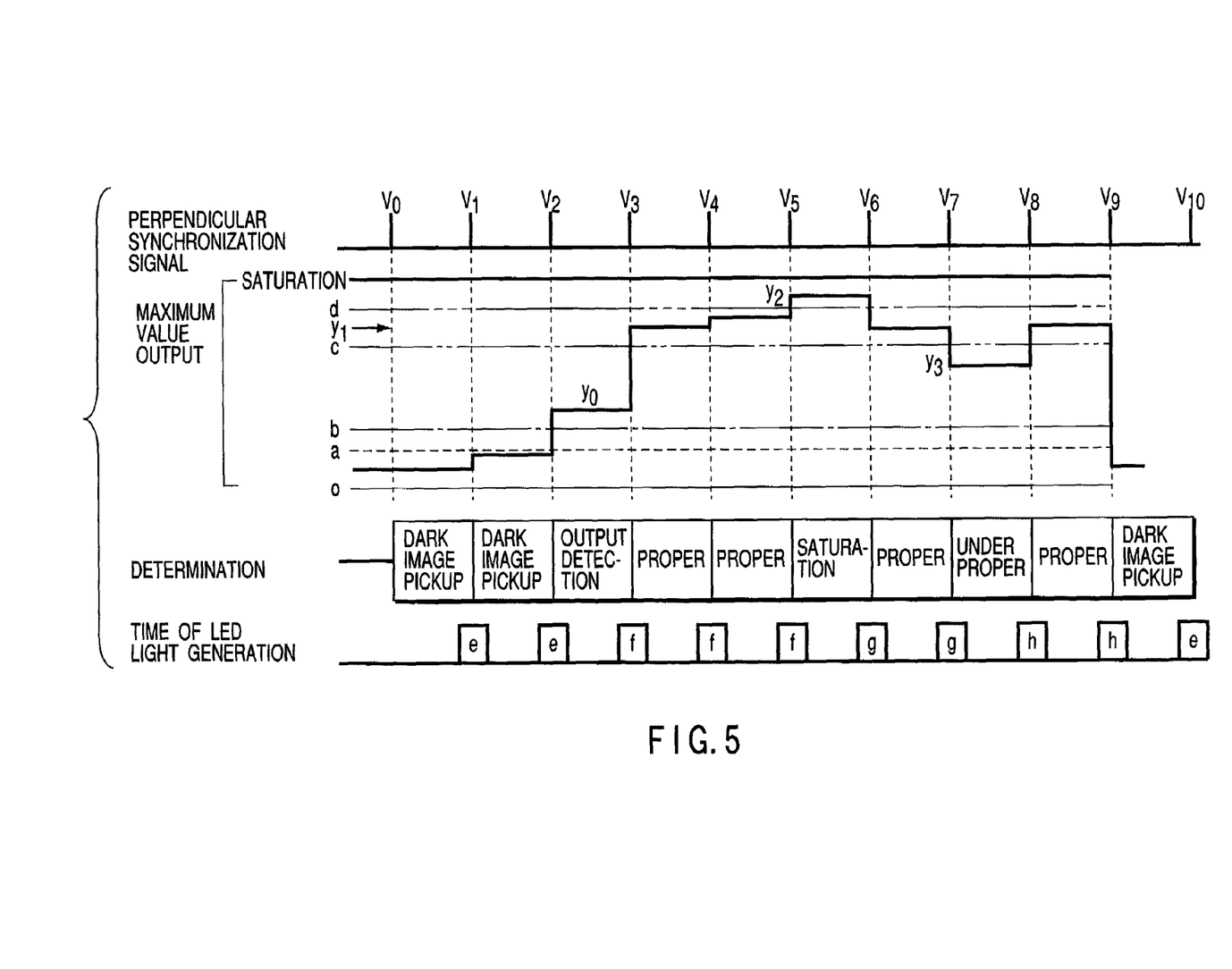
FIG. 5 is a timing chart for explaining an operation of the first embodiment.

In FIG. 5, the output from the maximum value detecting circuit 8 is less than the threshold a at the timing of V0 to V1. Therefore, the dark image pickup detecting circuit 20 outputs a signal representing a dark image pickup state to the CPU 2. The CPU 2 receives the signal from the dark image pickup detecting circuit 20 and determines a state as the dark image pickup one. And then, the CPU 2 controls the LED driving circuit 3 to reduce the amount of light generated by the LED 4. In the first embodiment, at the time of the control, the minimum time of light generation e is employed. This is to minimize current consumption.

As is a case of $V_2$ in FIG. 5, when the output-level from the maximum value detecting circuit 8 exceeds the threshold b, a start signal for making output from the image pickup element 5 proper levels is output from the output-level detecting circuit 22 to the CPU 2. The CPU 2 receives the output from the output-level detecting circuit 22 and calculates an amount of light generation to make the maximum value output from the maximum value detecting circuit 8 proper levels. Then, the CPU 2 outputs a pulse having a certain pulse width prepared on the basis of the calculated result to the LED driving circuit 3. The LED driving circuit 3 drives the LED 4 in accordance with the input pulse width.

In this embodiment, the reason for the threshold a of the dark image pickup detection differentiates from the threshold b for recognizing obtainment of output from the image pickup element 5 is that, when the maximum value output from the maximum value detecting circuit 8 is fluctuated with an influence caused by a noise of the signal, the influence can be reduce. When the noise-level of the signal is sufficiently small, the thresholds a and b may be equal.

A method of calculating the above-described amount of light now will be explained. That is, if the maximum value is assumed to be in between the threshold c and d as shown in FIG. 5, the proper level is changed of pulse width by the ratio to $(c+d)/2=y_1$, center value of the proper level, in the case of the maximum value output exceeding the threshold b being $y_0$.

Pulse width f is obtained as follows.

$$f = y_1/y_0 * e$$

The reason for setting the threshold c and d close to the saturation output is as follows. As the signal level increases, the S/N ratio rises, and thus, an image signal having less noise can be attained, which is advantageous.

Next, in FIG. 5, the maximum value output from the maximum value detecting circuit 8 is controlled so that it is at a proper level at the timing of $V_3$ to $V_4$. At $V_5$, the maximum value output from the maximum value detecting circuit 8 exceeds the threshold d. In this case, the saturation detecting circuit 21 shown in FIG. 3 outputs a saturation signal to the CPU 2. On receiving the output from the saturation detecting circuit 21, the CPU 2 reduces the amount of light generated to obtain the proper level. If it is assumed the output level is $Y_2$ on detecting the saturation state, pulse width g for making the maximum value the proper level is attained as follows.

$$g = y_1/y_2 * f$$

In this embodiment, if the pulse width can be variably controlled in a step fashion, shortening the light generation time by one step in a case of the maximum value exceeding the threshold d can serve as the above calculation. As a result, the process can be simplified.

At the timing of $V_6$ in FIG. 5, the maximum value output from the maximum value detecting circuit 8 is fixed at the proper level.

At the timing of $V_7$ in FIG. 5, when the output from the image pickup element 5 decreases and the maximum value output from the maximum value detecting circuit 8 goes under the threshold c, pulse width h is calculated from the decreased maximum value output $y_3$ in the following manner, thereby causing the LED 4 to emit light.

$$h = y_1/y_3 * g$$

At the timing of $V_8$ in FIG. 5, the maximum value output from the maximum value detecting circuit 8 is re-set to fit to the proper level. As shown at $V_9$ in FIG. 5, when the maximum value output from the maximum value detecting circuit 8 becomes less than the threshold a, the light generation time is controlled to become the minimum pulse width e at the timing of $V_{10}$ in FIG. 5.

Note that, in this embodiment, the amount of light generation can be varied by pulse width. However, it is also possible to vary the amount of light generated by the current. The LED 4 is assumed as to be the form of lighting in the present invention. However, other lighting means capable of emitting pulsed light can be used.

With the above-described arrangement, the minimum light generation is maintained for low illuminance exposure, so that electric power consumption can be reduced.

In addition, as shown in FIG. 5, control is performed in units of image pickup frames so that responsiveness is improved.

Furthermore, the light generation pulse width to be controlled is controlled within a predetermined range, because, as the pulse width becomes wider, current consumption in the lighting section increases, resulting in the battery life being shortened.

Second Embodiment

A second embodiment of the invention now will be explained.

The second embodiment differs from the first embodiment in that, when the photoelectric transform characteristics of an image pickup element to be used is approximated by a straight line, the line is negatively offset, differing from the first embodiment.

Figures 6, 7A, 7B, 7C:
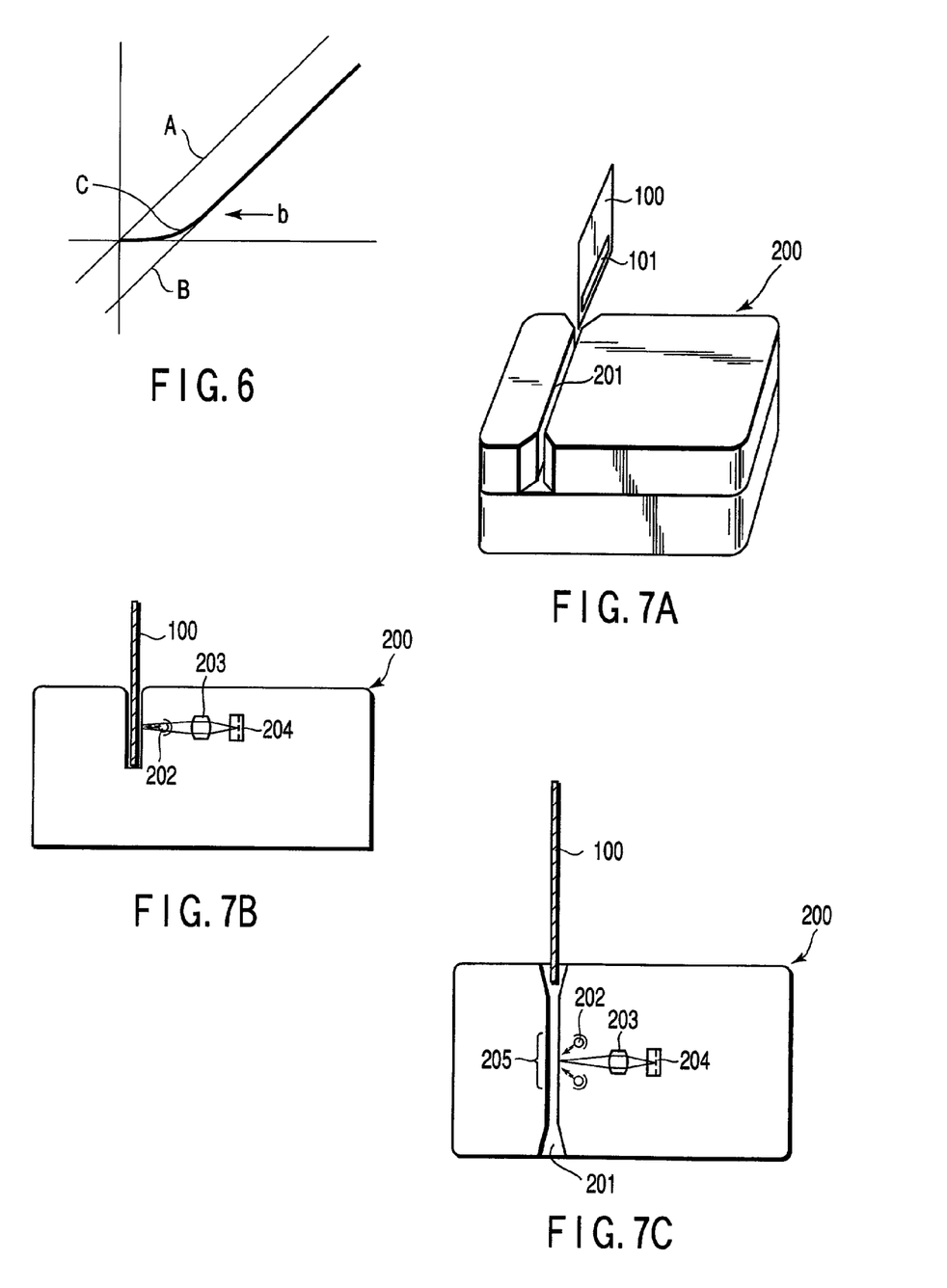
FIG. 6 is a diagram showing photoelectric transformation characteristics of an image pickup element in an image reading apparatus according to a second embodiment of the invention.
FIG. 7A is a perspective view of an image reading apparatus for a card medium.
FIG. 7B is a perspective illustration of the image reading apparatus of FIG. 7A viewed from close up.
FIG. 7C is an illustration of the image reading apparatus of FIG. 7A viewed from above.

That is, as shown in FIG. 6, the photoelectric transform characteristics of the image pickup element 5 of the first embodiment are represented by a straight line A, and light generation of the LED 4 is controlled in accordance with the photoelectric transform characteristics represented by this straight line A. On the other hand, in the second embodiment, the photoelectric transform characteristics C of the image pickup element for actual use is approximated with a straight line B, and light generation of the LED 4 is controlled in accordance with the photoelectric transform characteristics represented by the straight line B, having a negative offset.

Consequently, in accordance with the approximate straight line B in FIG. 6, when the light generation time is set to the lowest pulse width, no output exists. In some cases, it may happen that output does not exceed the threshold b, even though the image reading apparatus is closed to the image pickup plane 9 in FIG. 1. As a result, an inconvenience occurs in that the output level cannot be set at the proper level. In such a case, as shown in FIG. 6, the point at which the photoelectric transform characteristics of the image pickup element 5 becomes straight is set as the threshold b. In the operation of a dark image pickup, the LED 4 is caused to emit light of a pulse width through which a predetermined level exceeding the threshold b can always be attained in closing the apparatus.

In the present embodiment, assuming an output exceeding the threshold b to be $y_0$, it is not possible to calculate the pulse width through which the output $Y_1$ from the object image pickup element can be attained, owing to the existence of the negative offset, even though the formula used is substantially the same as in the first embodiment. Therefore, in such a case, it is preferable that the photoelectric transform characteristics of an image pickup element to be used are obtained in advance, and then pulse width in which the output becomes $y_1$ is attained on the basis of the photoelectric transform characteristics. In this manner, even if a negative offset occurs in the photoelectric transform characteristics of the image pickup element 5, it is still possible to control the output of the maximum value detection to be at the proper level. As a result, proper control of exposure can be performed promptly.

As has been described on the basis of the foregoing embodiments, the invention is not limited to the above-described embodiments but can also be modified within the spirit and scope of the present invention.

That is, in each of the above-described embodiments, the invention has been explained using an image reading apparatus of a manually-operated scanning type as an example, which reads an object to be read while moving the reading apparatus itself by hand. However, the invention is not limited to the apparatus of this sort. For example, an image reading apparatus of the following type may be adopted. In an apparatus, a card medium having a predetermined plane, on which an object to be read is printed, is manually or automatically moved by a certain distance along a linear groove. The object to be read is read from the moving card medium by an image pickup means, which has an optical axis in a direction perpendicular to the direction of the groove and is arranged in a stationary manner relative to the apparatus.

An example of an image reading apparatus for such a card medium is shown in FIGS. 7A to 7C. FIG. 7A is a perspective view of the image reading apparatus. FIG. 7B is a perspective side view of the image reading apparatus. FIG. 7C is a top view of the image reading apparatus.

In this example, the card 100 is made from paper, resin or the like. A coded image 101 represented by a one- or two-dimensional bar code or the like as an object to be read is printed on one plane, or both planes of the card.

An image reading apparatus 200 has a groove 201 serving to guide the card 100 to move linearly by a manual or automatic operation. At the middle of the groove 201, a lighting member 202 constituted by a LED or the like, lens 203 and image pickup element 204, are arranged as a reading section for reading the coded image 101.

Consequently, in the image reading apparatus 200, as shown in FIG. 7C, if a sidewall surface 205 of the groove opposing the reading section is colored black, which can absorb light from the lighting member 202 for example, the apparatus can determine from this dark image that a card 100 is not present in the groove 201. Then, the apparatus controls the amount of light from the lighting member 202 to be low. As a result, it is possible to eliminate wastage of electric power.

Here is a summary of the present invention.

(1) An image reading apparatus for optically reading an image, comprising:

lighting means for lighting a predetermined region including an object to be read;

image pickup means for receiving reflected light from the predetermined region lit by the lighting means and outputting a corresponding image pickup signal;

lighting control means for controlling an amount of light emitted by the lighting means in a predetermined range so as to arrange the image pickup signal output from the image pickup means at a proper level; and determining means for determining a dark image pickup state on the basis of the image pickup signal output from the image pickup means, wherein the lighting control means controls the amount of light emitted by the lighting means to be low when the determining means determines the dark image pickup state.

This aspect of the image reading apparatus is in accord with the first embodiment.

That is, it is possible to prevent the wastage of electric power caused by the lighting means generating maximum light in the dark image pickup state.

(2) The apparatus according to (1), wherein the lighting control means controls an amount of light emitted by the lighting means to be the lowest, within the predetermined range, when the determining means determines the dark image pickup state.

This aspect of the image reading apparatus is in accord with the first embodiment.

That is, as the amount of light is controlled to be the lowest with respect to the lighting means in the dark image pickup state, electric power consumption can be suppressed as much as possible.

(3) The apparatus according to (1), wherein, when the lighting control means controls, upon the determining means determining a dark image pickup state, an amount of light emitted by the lighting means to be low, the lighting control means controls an amount of light emitted by the lighting means so as to set the image pickup signal output from the image pickup means at a predetermined level.

This aspect of the image reading apparatus is in accord with the second embodiment.

That is, as the amount of light is set so as to attain an output equal to or above a specified value from an image pickup element, a dark image pickup state can be determined even in the image pickup element in which a negative offset occurs in the photoelectric transform characteristics (Referring to FIG. 6). As a result, an optimal exposure time can be set stably.

(4) The apparatus according to (1), wherein when the lighting means is configured to repeatedly generate pulsed light in units of image pickup frames, the determining means determines a dark image pickup state in units of the image pickup frames, the lighting control means controls an amount of light emitted by the lighting means in units of the image pickup frames.

This aspect of the image reading apparatus is in accord with the first embodiment.

That is, as an amount of light is controlled in units of image pickup frames, it is possible to control the amount of light to a fine degree even if an image pickup state is changed rapidly owing to reading by a manual scanning operation performed by an operator.

(5) The apparatus according to (1), wherein the determining means determines a dark image pickup state using an image pickup signal corresponding to a substantial center area in an image pickup display among image pickup signals output from the image pickup means.

This aspect of the image reading apparatus is in accord with the first embodiment.

That is, it is possible to detect a stable maximum value preventing from detecting maximum value at a peripheral area where regular reflection is likely to occur.

(6) The apparatus according to (1), wherein the lighting control means controls an amount of light emitted by the lighting means within a predetermined range so as to set the maximum value of an image pickup signal output from the image pickup means at a proper level.

This aspect of the image reading apparatus is in accord with the first embodiment.

That is, as the amount of light is controlled within a predetermined range, it is possible to shorten the time required for arranging the image pickup signal at proper level. It is also possible to suppress the power consumption of a battery or the like by suppressing the maximum amount of light.

(7) The apparatus according to (1), wherein the determining means compares the maximum value of an image pickup signal output from the image pickup means to a predetermined threshold, and determines a dark image pickup state in a case where the maximum value falls below the predetermined threshold.

This aspect of the image reading apparatus is in accord with the first embodiment.

That is, as the dark image pickup state can be determined by a simple process of comparison, a process becomes simpler. As a result, a stable determination can be achieved.

(8) The apparatus according to (7), wherein, when the maximum value is determined, by the determining means, to be equal to or above the predetermined threshold, the lighting control means controls an amount of light emitted by the lighting means within a predetermined range to set an image pickup signal output from the image pickup means at proper level.

This aspect of the image reading apparatus is in accord with the first embodiment.

That is, it is possible to control the image pickup signal to turn into a proper exposure state from a dark image pickup state, and thus stable image pickup can be achieved.

(9) An image reading apparatus for optically reading an image, comprising:

a LED for lighting a predetermined region including an object to be read;

an image pickup element for receiving reflected light from the predetermined region lit by the LED and outputting a corresponding image pickup signal;

a dark image pickup detecting circuit for determining a dark image pickup state on the basis of the image pickup signal output from the image pickup element; and a control section for controlling an amount of light supplied by the LED within a predetermined range to set the image pickup signal output from the image pickup element at a proper level, and controlling an amount of light supplied from the LED to be low, when the dark image pickup detecting circuit determines a dark image pickup state.

This aspect of the image reading apparatus is in accord with the first embodiment.

That is, it is possible to prevent the wastage of electric power, which is caused by the LED generating maximum light in the dark image pickup state.

(10) The apparatus according to (9), wherein the control section, when the dark image pickup detecting circuit determines the dark image pickup state, controls an amount of light of the LED to become the lowest in the predetermined range.

This aspect of the image reading apparatus is in accord with the first embodiment.

That is, as the amount of light is controlled to be lowest with respect to the LED in the dark image pickup state, electric power consumption can be suppressed as much as possible.

(11) The apparatus according to (9), wherein, when the control section controls, upon the dark image pickup detecting circuit determining a dark image pickup state, an amount of light emitted by the LED to be low, the control section controls an amount of light of the LED so as to set the image pickup signal output from the image pickup element at a predetermined level.

This aspect of the image reading apparatus is in accord with the second embodiment.

That is, as the amount of light is controlled so as to attain output equal to or above a specified value from an image pickup element, a dark image pickup state can be determined even in the image pickup element in which a negative offset occurs in the photoelectric transform characteristics (Referring to FIG. 6). As a result, an optimal exposure time can be set stably.

(12) The apparatus according to (9), wherein, when the LED is driven to repeatedly generate light pulses in units of image pickup frames, the dark image pickup detecting circuit determines a dark image pickup state in units of the image pickup frames, the control section controls an amount of light of the LED in units of the image pickup frames.

This aspect of the image reading apparatus is in accord with the first embodiment.

That is, as an amount of light is controlled in units of image pickup frames, it is possible to control an amount of light to a fine degree even if an image pickup state is changed rapidly owing to reading by a manual scanning operation performed by an operator.

(13) The apparatus according to (9), wherein the dark image pickup detecting circuit determines a dark image pickup state using an image pickup signal corresponding to a substantial center area in an image pickup display among image pickup signals output from the image pickup element.

This aspect of the image reading apparatus is in accord with the first embodiment.

That is, it is possible to detect stable maximum value preventing from detecting maximum value at a peripheral area where regular reflection is likely to occur.

(14) The apparatus according to (9), wherein the control section controls an amount of light of the LED within a predetermined range so as to set the maximum value of an image pickup signal output from the image pickup element at a proper level.

This aspect of the image reading apparatus is in accord with the first embodiment.

That is, as the amount of light is controlled within a predetermined range, it is possible to shorten the time required for setting the image pickup signal at a proper level. It is also possible to suppress consumption of a battery or the like by suppressing the maximum amount of light.

(15) The apparatus according to (9), wherein the dark image pickup detecting circuit compares the maximum value an of image pickup signal output from the image pickup element to a predetermined threshold, and determines a dark image pickup state in a case where the maximum value falls below the predetermined threshold.

This aspect of the image reading apparatus is in accord with the first embodiment.

That is, as the dark image pickup state can be determined by a simple process of comparison, a process becomes simpler. As a result, a stable determination can be achieved.

(16) The apparatus according to (15), wherein when the maximum value is determined to be equal to or above the predetermined threshold by the dark image pickup detecting circuit, the control section controls an amount of light of the LED within a predetermined range so as to set an image pickup signal output from the image pickup element at a proper level.

This aspect of the image reading apparatus is in accord with the first embodiment.

That is, it is possible to control the image pickup signal to turn into a proper exposure state from a dark image pickup state, and thus stable image pickup can be achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image reading apparatus for optically reading an image, comprising:
   lighting means for lighting a predetermined region including an object to be read;
   image pickup means for receiving reflected light from the predetermined region lit by the lighting means and for outputting a corresponding image pickup signal;
   lighting control means for controlling an amount of light emitted by the lighting means in a predetermined range so as to control the image pickup signal output from the image pickup means to a proper level; and
   determining means for determining a dark image pickup state based on the image pickup signal output from the image pickup means;
   wherein the lighting control means controls the amount of light emitted by the lighting means to be low when the determining means determines the dark image pickup state; and
   wherein the lighting means is configured to repeatedly generate pulsed light in units of image pickup frames, the determining means determines the dark image pickup state in units of the image pickup frames, and the lighting control means controls the amount of light emitted by the lighting means in units of the image pickup frames.

2. The apparatus according to claim 1, wherein the lighting control means controls the amount of light emitted by the lighting means to be a lowest amount, within the predetermined range, when the determining means determines the dark image pickup state.

3. The apparatus according to claim 1, wherein, when the lighting control means controls the amount of light emitted by the lighting means to be low when the determining means determines the dark image pickup state, the lighting control means controls the amount of light emitted by the lighting means so as to set the image pickup signal output from the image pickup means at a predetermined level.

4. The apparatus according to claim 1, wherein the lighting control means controls the amount of light emitted by the lighting means within the predetermined range so as to set a maximum value of the image pickup signal output from the image pickup means at a proper level.

5. The apparatus according to claim 1, wherein the determining means compares a maximum value of the image pickup signal output from the image pickup means to a predetermined threshold, and determines the dark image pickup state when the maximum value is below the predetermined threshold.

6. The apparatus according to claim 5, wherein, when the maximum value is determined by the determining means to be equal to or more than the predetermined threshold, the lighting control means controls the amount of light emitted by the lighting means within the predetermined range to set the image pickup signal output from the image pickup means at a proper level.

7. An image reading apparatus for optically reading an image, comprising:
   lighting means for lighting a predetermined region including an object to be read;
   image pickup means for receiving reflected light from the predetermined region lit by the lighting means and for outputting a corresponding image pickup signal;
   lighting control means for controlling an amount of light emitted by the lighting means in a predetermined range so as to control the image pickup signal output from the image pickup means to a proper level; and
   determining means for determining a dark image pickup state based on the image pickup signal output from the image pickup means;
   wherein the lighting control means controls the amount of light emitted by the lighting means to be low when the determining means determines the dark image pickup state; and
   wherein the determining means determines the dark image pickup state using an image pickup signal corresponding to a substantially central area in an image pickup display among image pickup signals output from the image pickup means.

8. The apparatus according to claim 7, wherein the lighting control means controls the amount of light emitted by the lighting means to be a lowest amount, within the predetermined ratage, when the determining means determines the dark image pickup state.

9. The apparatus according to claim 7, wherein, when the lighting control means controls the amount of light emitted by the lighting means to be low when the determining means determines the dark image pickup state, the lighting control means controls the amount of light emitted by the lighting means so as to set the image pickup signal output from the image pickup means at a predetermined level.

10. The apparatus according to claim 7, wherein the lighting control means controls the amount of light emitted by the lighting means within the predetermined range so as to set a maximum value of the image pickup signal output from the image pickup means at a proper level.

11. The apparatus according to claim 7, wherein the determining means compares a maximum value of the image pickup signal output from the image pickup means to a predetermined threshold, and determines the dark image pickup state when the maximum value is below the predetermined threshold.

12. The apparatus according to claim 11, wherein, when the maximum value is determined by the determining means to be equal to or more than the predetermined threshold, the lighting control means controls the amount of light emitted by the lighting means within the predetermined range to set the image pickup signal output from the image pickup means at a proper level.

13. An image reading apparatus for optically reading an image, comprising;
   an LED which lights a predetermined region including an object to be read;
   an image pickup element which receives reflected light from the predetermined region lit by the LED and which outputs a corresponding image pickup signal;

a dark image pickup detecting circuit which determines a dark image pickup state based on the image pickup signal output from the image pickup element; and a control section which controls an amount of light supplied by the LED within a predetermined range so as to control the image pickup signal output from the image pickup element to a proper level, and which controls an amount of light supplied from the LED to be low when the dark image pickup detecting circuit determines the dark image pickup state;

wherein the LED is driven to repeatedly generate light pulses in units of image pickup frames, the dark image pickup detecting circuit determines the dark image pickup state in units of the image pickup frames, and the control section controls the amount of light supplied from the LED in units of the image pickup frames.

14. The apparatus according to claim 13, wherein the control section controls the amount of light emitted by the LED to be a lowest amount in the predetermined range, when the dark image pickup detecting circuit determines the dark image pickup state.

15. The apparatus according to claim 13, wherein, when the control section controls the amount of light emitted by the LED to be low when the dark image pickup detecting circuit determines the dark image pickup state, the control section controls the amount of light emitted by the LED so as to set the image pickup signal output from the image pickup element at a predetermined level.

16. The apparatus according to claim 13, wherein the control section controls the amount of light emitted by the LED within the predetermined range so as to set a maximum value of the image pickup signal output from the image pickup element at a proper level.

17. The apparatus according to claim 13, wherein the dark image pickup detecting circuit compares a maximum value of the image pickup signal output from the image pickup element to a predetermined threshold, and determines the dark image pickup state when the maximum value is below the predetermined threshold.

18. The apparatus according to claim 17, wherein when the maximum value is determined by the dark image pickup detecting circuit to be equal to or more than the predetermined threshold, the control section controls the amount of light emitted by the LED within the predetermined range so as to set the image pickup signal output from the image pickup element at a proper level.

19. An image reading apparatus for optically reading an image comprising:

an LED which lights a predetermined region including an object to be read;

an image pickup element which receives reflected light from the predetermined region lit by the LED and which outputs a corresponding image pickup signal;

a dark image pickup detecting circuit which determines a dark image pickup state based on the image pickup signal output from the image pickup element; and a control section which controls an amount of light supplied by the LED within a predetermined range so as to control the image pickup signal output from the image pickup element to a proper level, and which controls an amount of light supplied from the LED to be low when the dark image pickup detecting circuit determines the dark image pickup state;

wherein the dark image pickup detecting circuit determines a dark image pickup state using an image pickup signal corresponding to a substantial center area in an image pickup display among image pickup signals output from the image pickup element.

20. The apparatus according to claim 19, wherein the control section controls the amount of light emitted by the LED to be a lowest amount in the predetermined range, when the dark image pickup detecting circuit determines the dark image pickup state.

21. The apparatus according to claim 19, wherein, when the control section controls the amount of light emitted by the LED to be low when the dark image pickup detecting circuit determines the dark image pickup state, the control section controls the amount of light emitted by the LED so as to set the image pickup signal output from the image pickup element at a predetermined level.

22. The apparatus according to claim 19, wherein the control section controls the amount of light emitted by the LED within the predetermined range so as to set a maximum value of the image pickup signal output from the image pickup element at a proper level.

23. The apparatus according to claim 19, wherein the dark image pickup detecting circuit compares a maximum value of the image pickup signal output from the image pickup element to a predetermined threshold, and determines the dark image pickup state when the maximum value is below the predetermined threshold.

24. The apparatus according to claim 23, wherein when the maximum value is determined by the dark image pickup detecting circuit to be signal to or more than the predetermined threshold, the control section controls the amount of light emitted by the LED within the predetermined range so as to set the image pickup signal output from the image pickup element at a proper level.

* * * * *